Nov. 3, 1936.  A. JONCHA  2,059,965
GREASE DISPENSING UNIT
Filed Oct. 10, 1931  3 Sheets-Sheet 3
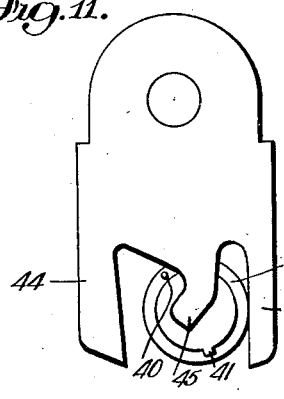
Fig. 11.
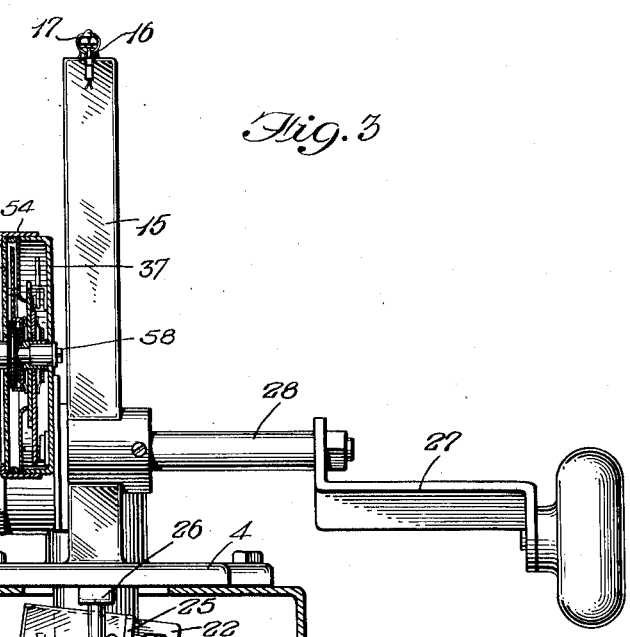
Fig. 3.
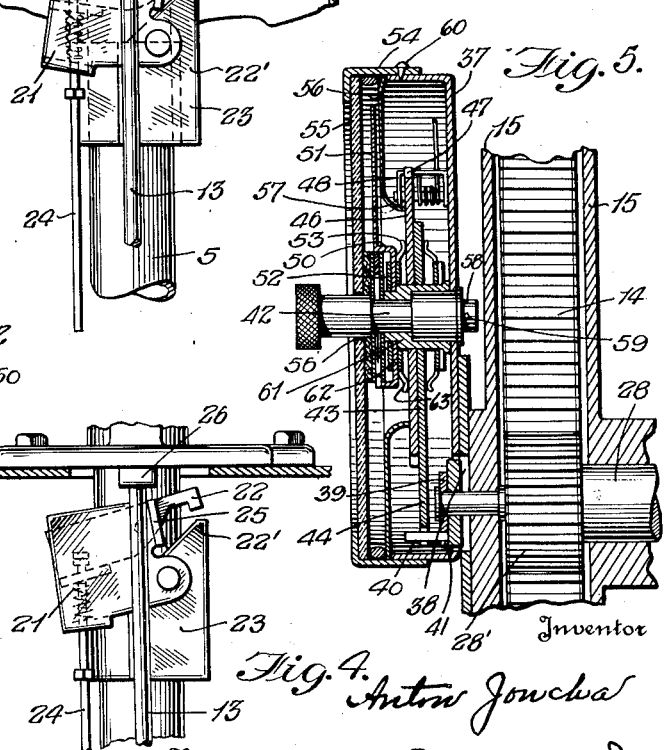
Fig. 5.
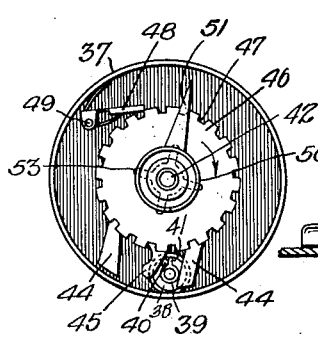
Fig. 8.
Fig. 4.
Inventor
Anton Joncha
By Jack Richmond
Attorney Patented Nov. 3, 1936

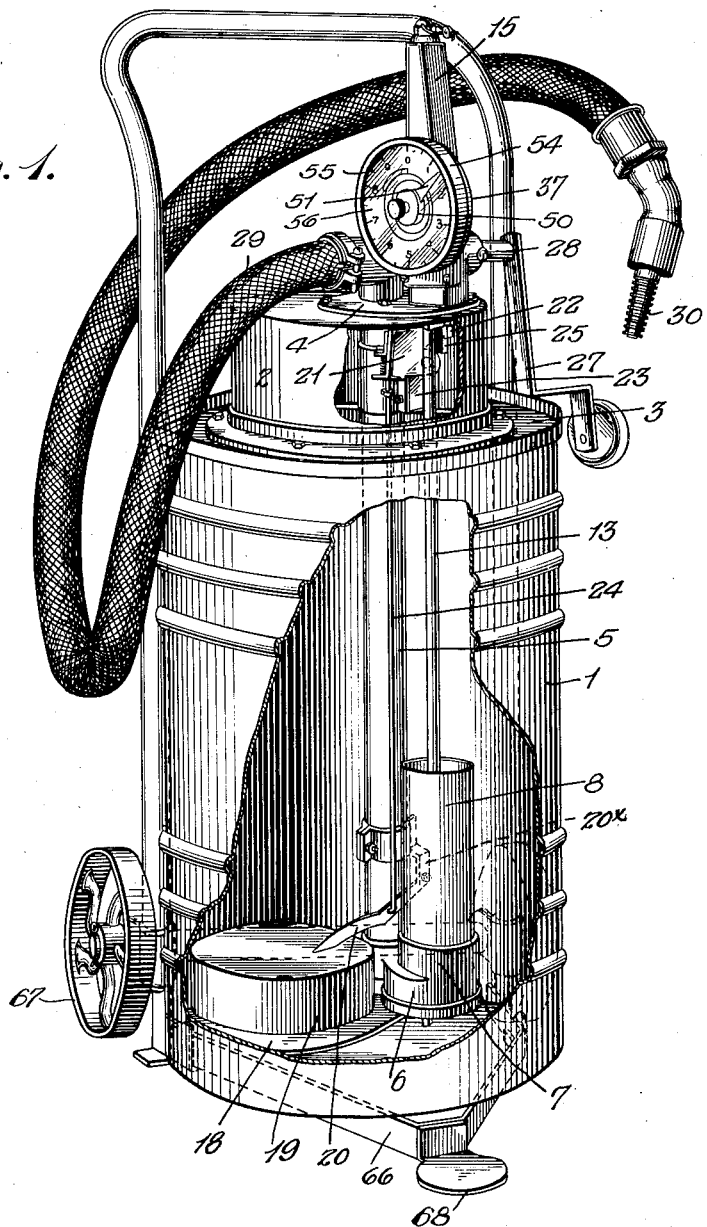

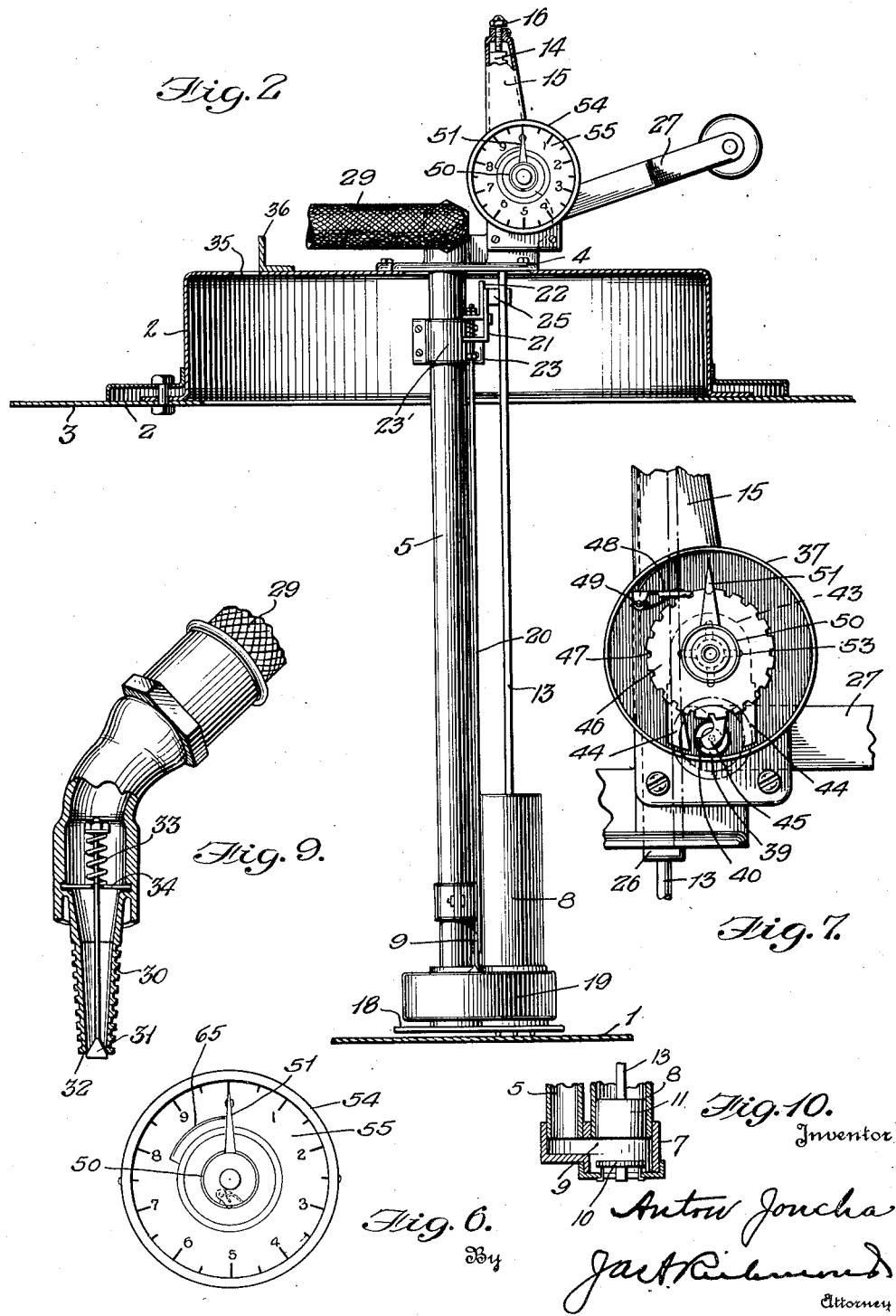

2,059,965

UNITED STATES PATENT OFFICE 2,059,965

GREASE DISPENSING UNIT

Anton Joncha, East Moline, Ill., assignor to American Machine and Metals Manufacturing Corporation, New York, N. Y., a corporation of Delaware Application October 10, 1931, Serial No. 568,156

12 Claims. (Cl. 221—102)

This invention is directed to a grease dispensing unit designed for use with the original container, and providing for the selective delivery of predetermined measured quantities from such original container.

The primary object is the production of a grease dispensing unit capable of convenient application to an original grease container, and including means for forcing the material from such container in measured quantities, with provision for insuring the accuracy of the delivered quantity, and for accurately and visibly registering the successive measured quantities so delivered.

A further object is the inclusion as a part of the dispensing unit, of a monitor head, designed to be substituted for the usual head of the original container, with such monitor head so secured to the container as to prevent any possibility of leakage from the container in handling the same.

A further object is to provide a pressure delivering means in the nature of a pump, so constructed and operated as to insure accurate filling of the pump cylinder and therefore accurate delivery of the desired quantity at each pump stroke, the suction stroke being regulatable and adjustable to insure extreme accuracy of the delivered quantity, with such stroke-adjusting means capable of being sealed against tampering.

A further object is the provision of a visible register to indicate each successive quantity delivered, the register being arranged to insure accuracy of quantity by failing to register unless the operating handle has been carried to the full limit of the suction stroke and until the handle has been carried to the extreme end of the delivery stroke, so that any quantity delivered less than that for which the device is set will not register.

A further object is to provide a register for a unit of this type, in which the indicator may be conveniently returned manually to the zero or starting point, but cannot be manually advanced, thus permitting resetting but avoiding any possibility of fraudulent advancing of the register.

A further object is the provision of locking means for the unit, whereby, when the contents of the original container are substantially exhausted, the pump rod is locked at the top of its stroke against further movement in pump function; said locking means being controlled entirely by the mass of material in the container and being wholly automatic in its action.

A further object is the provision of an automatic cut-off for the delivery nozzle of the unit, permitting accurate delivery of the material while preventing drip or leakage during non-delivery intervals.

The invention is illustrated in the accompanying drawings, forming a part hereof, wherein Figure 1 is a perspective view, partly broken away, of the improved dispensing unit.

Fig. 2 is an enlarged view of the head for co-operation with the container.

Fig. 3 is a broken side elevation showing the register in section and the means for locking out the pump actuating means.

Fig. 4 is a detail in elevation, showing the pump lockout in operative position.

Fig. 5 is a vertical sectional view of the register and pump actuator elements.

Fig. 6 is a face view of the register.

Fig. 7 is a similar view with the face plate or dial removed.

Fig. 8 is a similar view showing the register parts.

Fig. 9 is a broken view of the delivery end of the hose.

Fig. 10 is a broken vertical sectional view of the pump.

Fig. 11 is an elevation of a detail, showing the setting plate of the register in cooperation with the pump-handle operated projection.

The grease dispensing unit of this invention is designed for use with original grease containers, as 1, in which the grease is shipped, and constructed with a view to providing for the dispensing of the grease from such container in measured quantities, with each such delivery registered for observation of the customer, and with no possibility of leakage during or following such operation.

The original container 1 is usually closed by a cap-plate sealed in place, and one of the essential features of the present invention is the provision of a head 2, having a flange 3, with the head and flange so arranged and related that the flange may be secured to the upper end of the container through the same means and with the same sealing gaskets as was the original cap-plate, thus permitting the head of the dispensing unit to replace the cap-plate, and to seal the container against leakage as effectively as did the original cap-plate.

The head proper is of hollow cylindrical form, the upper wall being formed with an opening designed to be closed by a plate 4, sealingly secured in place by bolts or like fastenings. A hollow column 5, integral with the plate 4, extends above and below such plate, this column serving as the grease delivery conduit from the pump. The lower end of the column is provided with a cap-plate 6, provided with an offset ring 7 in which is rigidly secured a pump-cylinder 8. The cap-plate and cylinder, and thereby the column 5 and cylinder are in communication through an opening 9, and the lower open end of the cylinder is provided with a plate valve 10, movable and limited in a casting secured to the lower end of the cylinder. The plate valve has a diameter approximating that of the cylinder, and when in upper limit position provides a comparatively large area for the entrance of the grease, sealing the lower end of the cylinder against grease passage when in lower limit position.

A piston 11, with upper and lower spring-pressed gaskets 12, is operative within the cylinder, a pump rod 13, secured to the piston, extending upwardly through the upper open end of the cylinder in parallel relation to the column 5.

The upper end of the pump rod is formed as a rack bar 14, which extends upwardly through the plate 4, and into a hollow elongated casing 15, removably secured to the plate 2. The upper end of the casing 15 is provided with a threaded pin 16, in line with the upper end of the rack bar 14, and adjustable to limit the upward movement of the rack bar, and thereby the suction stroke of the piston 11. A removable cover 17 is provided to cover the upper end of the adjusting pin 16, with means whereby it may be removably sealed to the casing 15, to prevent tampering with the pump-stroke adjustment.

Obviously, operation of the piston in the upward direction, to the extent permitted by the adjusting pin 16, will draw a predetermined quantity of grease into the cylinder 8, past the valve 10, the downward stroke of the piston forcing the contained grease upwardly through the column 5. By appropriate setting of the adjusting pin 16, the suction stroke of the piston may be limited to control with great accuracy the quantity of grease drawn into the cylinder, and thereby control the quantity delivered on each power stroke.

It is important that the pump be prevented from operation when the level of the grease in the container has reached a point where the cylinder will not be accurately filled with grease on the suction stroke. Otherwise the grease delivered will be but a portion of the predetermined quantity. The automatic locking means includes a plate 18, offset from and carried by the ring 6, and an inverted pan-like control element 19, overlying the plate 18, and movable through an arm 20, pivotally carried by a bracket 20ˣ, removably secured to the column 5, near the lower end of the latter. The control element 19 is of cylindrical form, is hermetically sealed at both top and bottom, and is designed to be held by the surrounding grease in an upper position, that is spaced from the plate, and in the absence of such grease to gravitate to a lowered position, or into contact with the plate. The arm 20 of the control element is connected by a rod to a spring-set latch 21, having a latch nose 22, the notched end of which cooperates with a locking plate 22', carried by a bracket 23', removably secured to the column 5. The rod 24, directly operates the latch and thereby moves the locking plate in the respective movements of the control member. When the control member is held in an elevated position by the surrounding grease, the upper position of the rod 24, causes a nose projection 25 to move away from an abrupt shoulder 26 formed by the junction of the pump rod 13 and the rack bar 14, and when the control member moves downwardly through absence of surrounding grease, the rod 24 acts through the latch bar to move the nose 25 of the locking plate 22 into the path of the shoulder 26 and pressure or delivery stroke of the pump is prevented.

Thus, as long as grease is present to properly fill the cylinder on the suction stroke, the elements provided permit normal operation, but if the grease within the container is such as to possibly prevent proper filling of the cylinder, then the control element acts automatically to prevent further delivery of even that quantity which may be drawn into the cylinder. Of course, without the control the pump would still operate and would in the event of insufficient grease, act to deliver only a portion of the desired quantity. As this delivery is usually directly to the part to be served, as the transmission or differential of an automobile, there would be no way, in the absence of the automatic control, for the customer to know that he was getting the proper service. With the automatic control, each permitted stroke of the pump delivers a full charge of grease.

The pump is operated through a handle 27, secured on a shaft 28, extending through the casing 15, and provided within such casing with a pinion 28', cooperating with the rack bar 14. The grease delivered on each power stroke of the piston is forced through the column 5 and through a flexible hose 29, connected to an elbow terminal of such column above the plate 4. The delivery nozzle 30 at the free end of the hose is provided with a cut-off acting at the extreme end of the nozzle, and including a valve 31, opening outwardly and cooperating with a seat 32 at the extreme end of the nozzle, a rod connected to the valve, and under inwardly acting pressure of a spring 33, bearing between a nut on the end of the rod and a plate 34 within the nozzle, through which the rod passes, serving to instantly and completely close the valve on cessation of delivery pressure. Thus the nozzle is completely closed against leakage immediately following a delivery stroke of the pump. If desired, and as preferred, the nozzle when not in use, may be inserted through an opening 35 in the plate 2, the nozzle being exteriorly formed to fill and seal the opening. When in this inoperative position, the nozzle may be locked, through any convenient form of lock to an adjacent projection 36, to prevent unauthorized use.

A particularly important detail of a dispensing unit of this type is a means for visibly indicating the successive quantities delivered. This constitutes the only possible check by the customer on the service, and to be of value as a true indicator, such detail must possess certain important features. In the first place, such indicator must indicate with certainty that the amounts for which it is graduated are delivered through the nozzle. As the handle is moved in one direction for suction and in the opposite direction for delivery, it will be apparent that only partial strokes of the handle are possible, and thus less than the predetermined quantity may be delivered. If the indicator acts on the initial movement of the handle, then it is possible to operate the indicator, without delivery of the full quantity. Thus the ideal indicator must act only at the extreme limits of each piston stroke, so that if less than the full stroke of the piston is made at each operation, the indicator will not show a delivery at all. Furthermore, the indicator must be capable of being reset by the operator, that is returned to zero or starting position, but incapable of being manually advanced.

The indicator or register of the present invention is therefore operative only at the extreme strokes of the piston, and while capable of being manually reset, cannot be manually advanced.

The indicator comprises a circular casing 37 of conventional type, formed with an opening 38 in its rear wall, and secured to the casing 15, with the opening 38 in line with the end of the shaft 28 on which the handle 27 is secured. The end of shaft 28 extends within the opening 38, and an actuator 39 is loosely rotatable on the end of the shaft, being formed with an interior projection 40, engageable by a projection 41 on the shaft, so that the actuator is rotatably reciprocated in the movements of the shaft. Fixed against endwise movement in the rear wall of the casing 37 is a hollow shaft 42, on which, within the casing, is mounted a setting plate 43, having spaced parallel arms 44 projecting therefrom, and an intermediate operating projection 45. The arms 44 and projection 45 are arranged in the plane of the plate, and the projection 45 is of less length than the arms, with its opposing edges curved. Overlying the plate 43 on the shaft 42 is a peripherally notched disk 46, the peripheral notches 47 of which are spaced to indicate a single delivery of material. A spring-pressed pawl 48 is mounted on a stub 49 projecting from the rear wall of the casing, the operative end of the pawl being formed to cooperate with the notches 47 and permit free movement of the disk in advance indicating movement, while preventing opposite movement. Overlying the disk 46 on the shaft 42 is a cup-shaped member 50 having a radial projection 51 serving as an indicator. A washer-disk 52 on the end of the shaft 42, inwardly of the cup-shaped member 50, serves to frictionally bind the plate 43, the disk 46, and the member 50, to cause these parts to move as a unit in the absence of such power as may overcome the friction. If desired a friction plate 53 may be interposed between the member 50 and the disk 46 to insure the frictional cooperation. The casing is closed by an interfitting cover 54, having a transparent face 55, a graduated dial plate 56, being interposed between the cover face and the disk 46. This dial, which is marked for the determinate quantities to be delivered, is formed with a central opening 57 to permit the projection therethrough of the member 50, the pointer or indicator 51 overlying the dial plate and cooperating with the markings thereon.

A stud 58 projects loosely through the face plate 55 of the cover, being designed to extend through the hollow shaft 42, and provided beyond such shaft with a cotter pin 59 to secure the parts together, screws 60 passing through the wall of the cover and taking into the wall of the casing further securing the parts. The shaft 58 beyond the face plate 55 has a knurled head for convenient operation of the shaft, and inwardly of the face plate, the shaft is provided with a disk-like element 61, of a diameter to fit within the cup-shaped member 50. The element 61 is provided with a pawl 62, operating through the periphery of the element, and serving when the stud shaft 58 is turned manually in a direction to reset the pointer indicator 51 to engage in a notch 63 in the rim of the member 50, and thus move the member and thereby the pointer indicator toward initial or zero position, on movement of the stud shaft 58 in the opposite direction, however, the pawl rides past the notch and does not affect the member 50. Thus the pointer indicator may be reset but cannot be advanced manually.

The parts are so arranged that the projection 45 of the plate 43 is in the path of movement of the actuator 39, which, as stated, is reciprocated in the respective movements of the pump handle. To operate the register, the actuator is provided with a projection 40, which, in the rotary reciprocation of the actuator engages with the opposite faces or edges of the projection 45. However, this engagement obviously occurs only at the extreme ends of the piston strokes, for in the intervening portions of the movement the projection 64 is moving free of the part 45. Thus on the suction pump movement of the handle, the projection 40, during the final portion of such movement engages with the arm 45 and so moves the plate 43, but as the pawl operates to hold the disk 46 against similar movement, such disk and thereby the pointer indicator 51 are prevented from movement. During the power or delivery stroke of the handle, the projection 40 is moving free of all indicator parts until at the extreme limit of this movement, such projection engages the opposite face of the arm 45, moving the plate 43 in the opposite direction. The pawl 48 rides over the notches 47 of the disk 46 during this movement, so that the disk under the frictional engagement with the plate 43 will move with the plate, and the cup-shaped member 50, and thereby the pointer indicator 51, will move with the disk through the frictional engagement with the disk. Thus the pointer will be advanced to the next indication on the dial.

It is important to note in this connection that the plate 43 is not set nor the disk 46 moved by the projection 40 except that the handle shall have completed its particular movement. Thus if the suction stroke has not been fully completed, the plate 43 is not set, or if the delivery stroke has not been fully completed, the register is not advanced. Therefore, if the pump is not completely operated for full delivery of the predetermined quantity, the delivery is not registered, and the customer is at once advised of the insufficient service.

The pointer indicator 51 can be manually reset in the manner described, but cannot be advanced. Furthermore, the dial plate 56 carries a spring arm 65 over which the pointer 51 rides and depresses as such pointer approaches the zero position or maximum indication, the spring arm rising in rear of the pointer as such pointer reaches the maximum position to prevent even manual resetting from this point, an obviously protective arrangement.

The construction includes a truck having a portion 66 to underlie the container, with a three-point support, two of which are ground wheels 67 and the third a foot-plate 68. The truck frame extends longitudinally of the container in the form of a handle section, which may be removably secured to the container, and which extends above the same for convenient handling of the container in an obvious manner.

The improved grease dispensing apparatus includes a unitary construction which will cooperate with the original container, and which when in place will prevent all possible leakage from such container, the construction further providing for an exactly accurate delivery of the predetermined quantity, with a register for indicating such deliveries operative only in the event the full delivery is made. Adjustment to insure accurate measurement of delivered quantities, and means to prevent nozzle dripping are inherent characteristics.

What is claimed as new is:—

1. A grease-dispensing unit including a head to cooperate with and provide a sealing closure for an original grease container, a hollow column depending from the head, a pump carried by and communicating with the column, means carried by the head for operating the pump, and means carried by the column to lock the pump operating means against operation under predetermined conditions.

2. A grease-dispensing unit including a head to cooperate with and provide a sealing closure for an original grease container, a hollow column depending from the head, a pump carried by and communicating with the column, means carried by the head for operating the pump, means carried by the head for registering each pump operation, said means being set for registering operation by pump movement in one direction and operated for registration only at the limit of pump movement in the opposite direction.

3. In combination with a grease dispensing unit including a submerged pump delivery means, a register set for operation at the limit of pump movement in one direction and means to operate the register for registration at the limit of pump movement in the opposite direction.

4. In combination with a grease dispensing pump, a register including frictionally-controlled elements operating in unison for registration effect, means for operating one of the elements independently of the other at each similar pump movement to set the frictional relation between the elements, and means responsive to opposite similar pump movements to operate the set elements as a unit for registration effect.

5. In combination with a grease dispensing pump, a register including a registering element and a setting element arranged for frictional cooperation, means for operating the setting element at the extreme limit of each similar pump movement, said means operating at the extreme limit of each opposite pump movement to move the elements as a unit for registering effect.

6. In combination with a grease dispensing pump, a register including a registering element, a setting element having frictional cooperation with the registering element, and means responsive to opposite pump movements to first set the elements relatively and then operate them simultaneously for registering effect, the said means operating at the extreme limits of the respective pump movements.

7. In combination with a grease dispensing pump, a pump-responsive register comprising frictionally-cooperating elements, and means for relatively operating said elements at the limit of one pump movement and for simultaneously operating said elements only at the limit of the opposite pump movement, and means for locking one of the elements during their relative movement.

8. In combination with a grease dispensing pump, a pump-responsive register, comprising a registering element and a setting element, said elements being maintained in frictional cooperation, and means operated at the extreme limits of opposite pump movements for independently operating the setting element in one direction in one such movement and then operating the setting element in the opposite direction in the other such movement, the movement of the setting element in said opposite direction compelling similar movement of the registering element.

9. In combination with a grease dispensing pump, a pump-responsive register comprising a registering element and a setting element in frictional cooperation sufficient to compel simultaneous movements of the elements in the absence of restriction, means responsive to opposite final limit pump movements only to move the setting element in opposite directions, and means for preventing similar movement of the registering element during one of such movements of the setting element.

10. In combination with a grease dispensing pump, a pump-responsive register including a registering element and a frictionally cooperating setting element, means responsive to opposite final limit pump movements only to move the setting element in opposite directions, means for locking the registering element against movement during one of such movements of the setting element, said means freeing the registering element during opposite movement of the setting element, the locking means cooperating with the registering element only following a full predetermined movement of the setting element, whereby in the absence of a pump movement sufficient for the predetermined movement of the setting element complete registration is prevented.

11. A grease dispensing unit including a head for a grease container, a hollow column depending from the head, a pump carried by and communicating with the column, a pump rod for the pump having an enlargement near the upper end, a pivoted locking plate having a projection movable into and out of the path of said enlargement, and means controlled by the grease volume in the container for moving said locking plate projection relative to said enlargement.

12. A grease dispensing unit including a head for a grease container, a hollow column depending from the head, a pump carried by and communicating with the column, a pump rod for the pump having an enlargement near the upper end, a pivoted locking plate having a projection movable into and out of the path of said enlargement, and means controlled by the grease volume in the container for moving said locking plate projection relative to said enlargement, said means including a hollow element carried by and arranged at the lower end of the column and a rod operated by said element and connected to said locking plate.

ANTON JONCHA.